US008927045B2

(12) United States Patent
Barendse et al.

(10) Patent No.: US 8,927,045 B2
(45) Date of Patent: *Jan. 6, 2015

(54) PROCESS FOR THE PREPARATION OF A SPREADABLE DISPERSION

(76) Inventors: Sandra Petronella Barendse, Vlaardingen (NL); Eckhard Floter, Vlaardingen (NL); Wim Theodorus Hogervorst, Vlaardingen (NL); Dirk Simon Hendriks Van Horsen, Vlaardingen (NL); Hindrik Huizinga, Vlaardingen (NL); Gijsbert Michiel Peter van Kempen, Vlaardingen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,943

(22) Filed: Mar. 30, 2012

(65) Prior Publication Data

US 2012/0263860 A1 Oct. 18, 2012

Related U.S. Application Data

(63) Continuation of application No. 11/884,282, filed as application No. PCT/EP2006/000800 on Jan. 25, 2006, now Pat. No. 8,147,895.

(30) Foreign Application Priority Data

Feb. 17, 2005 (EP) .................................. 05075384
Feb. 17, 2005 (EP) .................................. 05075391
Feb. 17, 2005 (EP) .................................. 05075392
Feb. 17, 2005 (EP) .................................. 05075393

(51) Int. Cl.
*A23D 7/02* (2006.01)
*A23D 7/005* (2006.01)
*A23L 1/40* (2006.01)
*A23D 9/007* (2006.01)
*A23D 9/05* (2006.01)

(52) U.S. Cl.
CPC .............. *A23D 9/007* (2013.01); *A23D 7/0056* (2013.01); *A23L 1/40* (2013.01); *A23D 9/05* (2013.01); *A23V 2002/00* (2013.01)
USPC .............................. 426/602; 426/285; 426/607

(58) Field of Classification Search
None
See application file for complete search history.

(56) References Cited

U.S. PATENT DOCUMENTS

| 2,521,219 | A | 9/1950 | Holman et al. |
| 2,615,160 | A | 10/1952 | Baur |
| 2,815,286 | A | 12/1957 | Andre |
| 3,120,438 | A | 2/1964 | McIntire et al. |
| 3,170,799 | A | 2/1965 | Feuge et al. |
| 3,270,040 | A | 8/1966 | Bradshaw et al. |
| 3,295,986 | A | 1/1967 | Saslaw et al. |
| 3,338,720 | A | 8/1967 | Pichel |
| 3,425,843 | A | 2/1969 | Japikse |
| 3,528,823 | A | 9/1970 | Rossen |
| 3,881,005 | A | 4/1975 | Thakkar et al. |
| 3,892,880 | A | 7/1975 | Grolitsch |
| 4,160,850 | A | 7/1979 | Hallstrom et al. |
| 4,226,894 | A | 10/1980 | Gawrilow |
| 4,232,052 | A | 11/1980 | Nappen |
| 4,234,606 | A | 11/1980 | Gawrilow |
| 4,308,288 | A | 12/1981 | Hara et al. |
| 4,375,483 | A | 3/1983 | Shuford et al. |
| 4,385,076 | A | 5/1983 | Crosby |
| 4,391,838 | A | 7/1983 | Pate |
| 4,578,274 | A | 3/1986 | Sugisawa et al. |
| 4,591,507 | A | 5/1986 | Bodor et al. |
| 4,826,699 | A | 5/1989 | Soe |
| 4,855,157 | A | 8/1989 | Tashiro et al. |
| 4,889,740 | A | 12/1989 | Price |
| 4,917,915 | A | 4/1990 | Cain et al. |
| 5,130,156 | A | 7/1992 | Bergquist et al. |
| 5,185,173 | A | 2/1993 | Bethke et al. |
| 5,186,866 | A | 2/1993 | Ryuo et al. |
| 5,352,475 | A | 10/1994 | Tholl |
| 5,391,382 | A | 2/1995 | Chappel |
| 5,429,836 | A | 7/1995 | Fuisz et al. |
| 5,447,735 | A | 9/1995 | Miller |
| 5,516,543 | A | 5/1996 | Amankonah et al. |
| 5,620,734 | A | 4/1997 | Wesdorp et al. |
| 5,707,670 | A | 1/1998 | Mehansho et al. |
| 5,916,608 | A | 6/1999 | Lanting et al. |
| 6,020,003 | A | 2/2000 | Stroh et al. |
| 6,031,118 | A | 2/2000 | Van Amerongen et al. |
| 6,056,791 | A | 5/2000 | Weidner et al. |

(Continued)

FOREIGN PATENT DOCUMENTS

DE  2253515  5/1974
DE  10253111  5/2004

(Continued)

OTHER PUBLICATIONS

Anon. 1982. The American Heritage Dictionary, $2^{nd}$ edition. Houghton Mifflin Co., Boston, p. 407 & 1225.*
Van Den Enden et al., Rapid Determination of Water Droplet Size Distribution by PFG-NMR, Journal of Colloid and Interface Science, 1990, vol. 140 No. 1, 105-113.
Assignment from FeyeCon to Unilever Nederland BV dated Jul. 17, 2003 (FeyeCon incorrectly characterized as a Unilever subsidiary).
Co-pending application Dobenesque et al., U.S. Appl. No. 13/139,584, filed Sep. 8, 2011.
Co-pending application Dobenesque et al., U.S. Appl. No. 13/133,956, filed Jul. 8, 2011.
Co-pending application Bezemer et al., U.S. Appl. No. 13/139,580, filed Sep. 8, 2011.

(Continued)

*Primary Examiner* — Carolyn Paden
(74) *Attorney, Agent, or Firm* — Gerard J. McGowan, Jr.

(57) ABSTRACT

Process for the preparation of a spreadable edible dispersion wherein a mixture of oil and solid structuring agent particles is subjected to stirring and an aqueous phase and/or solid phase is gradually added to the mixture until a dispersion of the desired oil content is obtained, wherein the solid structuring agent particles have a microporous structure of submicron size particles.

19 Claims, 1 Drawing Sheet

(56) References Cited

U.S. PATENT DOCUMENTS

| | | |
|---|---|---|
| 6,106,886 A | 8/2000 | van Amerongen et al. |
| 6,117,478 A | 9/2000 | Dubberke |
| 6,129,944 A | 10/2000 | Tiainen et al. |
| 6,156,370 A | 12/2000 | Huizinga et al. |
| 6,190,680 B1 | 2/2001 | Sakurada et al. |
| 6,217,920 B1 | 4/2001 | Van Endenburg et al. |
| 6,248,389 B1 | 6/2001 | Biller et al. |
| 6,312,752 B1 | 11/2001 | Lansbergen et al. |
| 6,316,030 B1 | 11/2001 | Kropf et al. |
| 6,322,842 B1 | 11/2001 | Reddy et al. |
| 6,352,737 B1 | 3/2002 | Dolhaine et al. |
| 6,395,324 B1 | 5/2002 | Effey et al. |
| 6,423,326 B1 | 7/2002 | Shapiro |
| 6,423,363 B1 | 7/2002 | Traska et al. |
| 6,468,578 B1 | 10/2002 | Bodor et al. |
| 6,582,749 B2 | 6/2003 | Merrick et al. |
| 6,743,450 B2 | 6/2004 | Romanczyk, Jr. et al. |
| 6,800,317 B2 | 10/2004 | Wester et al. |
| 6,827,964 B2 | 12/2004 | Wester et al. |
| 6,929,816 B2 | 8/2005 | Wester |
| 7,601,184 B2 | 10/2009 | Tischendorf |
| 8,025,913 B2 * | 9/2011 | van den Berg et al. ........ 426/602 |
| 8,124,152 B2 * | 2/2012 | Janssen et al. ................ 426/285 |
| 8,147,895 B2 * | 4/2012 | Barendse et al. ............ 426/602 |
| 2002/0034577 A1 | 3/2002 | Vogensen |
| 2002/0048606 A1 | 4/2002 | Zawistowski |
| 2002/0076476 A1 | 6/2002 | Kuil et al. |
| 2002/0132035 A1 | 9/2002 | Tamarkin et al. |
| 2002/0168450 A1 | 11/2002 | Drudis et al. |
| 2003/0068425 A1 | 4/2003 | Khare |
| 2003/0124228 A1 | 7/2003 | Goto et al. |
| 2003/0124288 A1 | 7/2003 | Merziger et al. |
| 2003/0165572 A1 | 9/2003 | Auriou |
| 2003/0203854 A1 | 10/2003 | Pischel et al. |
| 2004/0076732 A1 | 4/2004 | Valix |
| 2004/0101601 A1 | 5/2004 | Loh et al. |
| 2004/0105931 A1 | 6/2004 | Basheer et al. |
| 2004/0166204 A1 | 8/2004 | Smith et al. |
| 2004/0197446 A1 | 10/2004 | Haynes et al. |
| 2005/0069625 A1 | 3/2005 | Chimel et al. |
| 2005/0123667 A1 | 6/2005 | Sakuma et al. |
| 2005/0196512 A1 | 9/2005 | Nakhasi et al. |
| 2006/0019021 A1 | 1/2006 | Plank et al. |
| 2006/0035871 A1 | 2/2006 | Auweter et al. |
| 2006/0051479 A1 | 3/2006 | Chiavazza et al. |
| 2006/0115553 A1 | 6/2006 | Gautam et al. |
| 2006/0280855 A1 | 12/2006 | Van den Berg et al. |
| 2008/0089978 A1 | 4/2008 | Grigg et al. |
| 2008/0187645 A1 | 8/2008 | Ekblom et al. |
| 2008/0193628 A1 | 8/2008 | Garbolino et al. |
| 2008/0226786 A1 | 9/2008 | Ward et al. |

FOREIGN PATENT DOCUMENTS

| | | |
|---|---|---|
| EP | 21483 A1 | 1/1981 |
| EP | 0089082 A1 | 9/1983 |
| EP | 0237120 A1 | 9/1987 |
| EP | 0294692 A2 | 12/1988 |
| EP | 393963 A2 | 4/1990 |
| EP | 572051 A1 | 3/1993 |
| EP | 0775444 A1 | 5/1997 |
| EP | 0780058 A1 | 6/1997 |
| EP | 0796567 A1 | 9/1997 |
| EP | 0744992 B1 | 10/1997 |
| EP | 897671 B1 | 2/1999 |
| EP | 0898896 A1 | 3/1999 |
| EP | 0962150 A1 | 12/1999 |
| EP | 1114674 A2 | 7/2001 |
| EP | 1180545 A1 | 2/2002 |
| EP | 1197153 A1 | 4/2002 |
| EP | 1238589 | 8/2002 |
| EP | 1285584 A2 | 2/2003 |
| EP | 1419698 A1 | 5/2004 |
| EP | 1557090 A1 | 7/2005 |
| EP | 1795257 A1 | 6/2007 |
| EP | 1815752 A1 | 8/2007 |
| EP | 2016834 A1 | 1/2009 |
| EP | 2123164 A1 | 11/2009 |
| EP | 2181604 A1 | 5/2010 |
| JP | 59051742 A2 | 3/1984 |
| WO | WO9308699 | 5/1993 |
| WO | WO9521688 | 8/1995 |
| WO | WO9614755 A1 | 5/1996 |
| WO | WO9619115 A1 | 6/1996 |
| WO | WO9638047 | 12/1996 |
| WO | WO9742830 | 11/1997 |
| WO | WO9847386 | 10/1998 |
| WO | WO0041491 | 7/2000 |
| WO | WO0100046 A1 | 1/2001 |
| WO | WO0132035 A1 | 5/2001 |
| WO | WO0143559 A2 | 6/2001 |
| WO | WO0166560 A2 | 9/2001 |
| WO | WO0178529 A2 | 10/2001 |
| WO | WO0191569 A1 | 12/2001 |
| WO | WO02100183 A2 | 12/2002 |
| WO | WO03043430 A1 | 5/2003 |
| WO | WO03084337 | 10/2003 |
| WO | WO03966817 A1 | 11/2003 |
| WO | WO03103633 A1 | 12/2003 |
| WO | WO2004093571 A1 | 11/2004 |
| WO | WO2005014158 A1 | 2/2005 |
| WO | WO2005071053 A1 | 8/2005 |
| WO | WO2005074717 A1 | 8/2005 |
| WO | WO2005074726 A1 | 8/2005 |
| WO | WO2006066979 A1 | 6/2006 |
| WO | WO2006079445 A1 | 8/2006 |
| WO | WO2006087090 A1 | 8/2006 |
| WO | WO2006087092 A2 | 8/2006 |
| WO | WO2006087093 A1 | 8/2006 |
| WO | WO2007022897 A1 | 3/2007 |
| WO | WO2007024770 A2 | 3/2007 |
| WO | WO2007039020 A1 | 4/2007 |
| WO | WO2007039040 A1 | 4/2007 |
| WO | WO2007096211 A1 | 8/2007 |
| WO | WO2007096243 A1 | 8/2007 |
| WO | WO2008125380 A1 | 10/2008 |
| WO | WO2009068651 A1 | 6/2009 |
| WO | WO2010060713 A1 | 6/2010 |
| WO | WO2010069746 A1 | 6/2010 |
| WO | WO2010069747 A1 | 6/2010 |
| WO | WO2010069750 A1 | 6/2010 |
| WO | WO2010069751 A1 | 6/2010 |
| WO | WO2010069752 A1 | 6/2010 |
| WO | WO2010069753 A1 | 6/2010 |
| WO | WO2011160921 A1 | 12/2011 |

OTHER PUBLICATIONS

Co-pending application Dobenesque et al., U.S. Appl. No. 13/133,952, filed Aug. 23, 2011.

Co-pending application van den Berg et al., U.S. Appl. No. 13/224,550, filed Sep. 2, 2011.

Co-pending application Den Adel et al., U.S. Appl. No. 13/133,954, filed Jun. 10, 2011.

Co-pending application Dobenesque et al., U.S. Appl. No. 13/133,955, filed Jul. 8, 2011.

Munuklu, Experimental and Analytical Facilities, Delft University of Technology, Dec. 16, 2005, pp. 41-51.

Munuklu et al., "Supercritical Melt Micronization Using the Particles from Gas Saturated Solution Process" American Chemical Society, 2003, 23, pp. 353-369.

Hydrogenation, Wikipedia Hydrogenation, 10 PP.

Interesterified fat, Wikipedia Article Sources and Contributors, 4 PP.

Strawberry Powder Flavor GA1403, Strawberryflavor.com 2005, p. 1.

Anonymous, Particle Sizes of Milk Powders, Dairy Ingredients, 2000 vol. 2 No. 4 p. 1, 2, Dairy Products Technology Center.

Belitz et al., Milk and Dairy Products, Food Chemistry, 1999, pp. 470-474 and 497-498 XP-002264854—Table 10.4, Springer Verlag, Berlin.

(56) References Cited

OTHER PUBLICATIONS

De Graaf, Consumption of tall oil-derived phytosterols in a chocolate matrix significantly decreases plasma total and low-density lipoprotein-cholesterol levels, British Journal of Nutrition, Jun. 18, 2002 88 pp. 479-488.
Elvers et al, Margarines and shortenings, Ullmanns Encyclopedia of Industrial Chemistry, 1990, 5th Edition, vol. A16, 156-158.
Fereidoon Shahidi et al, Margarine processing plants and equipment, Edible Oil and Fat Product, 2005, 5, 502 and 518.
Fischer, May 2001, Food Ingredients and Analysis Int'l, Food Ingredients and Analysis Int'l, vol. 73, No. 3, 29-31.
Garti et al., Stabilization of Water-in-Oil Emulsions by Submicrocrystalline a-Form Fat Particles, Journal of the American Oil Chemists' Society, 1998, 75, 12, 1825-1831.
Gerber et al., Effect of Process-Parameters on Particles Obtained by the Rapid Expansion of Supercritical Solutions, World Congress on Particle Technology, 1998, 3, pp. 1-11.
Gunstone et al, Food uses of oils and fats, The Lipid Handbook, 2007, Third Edition, 336-341.
Gunstone et al, 2007, Occurrence and Characterisation of Oils and Fats, The Lipid Handbook, 3rd edition, pp. 51, 55, 63, 66 and 67.
Gunstone et al., Polymorphism and nomenclature of lipid crystal forms, The Lipid Handbook, 1995, 8.1.3, Chapman & Hall.
Gunstone, The Lipid Handbook, The Lipid Handbook 1994, 2nd ED, 321, Chapman & Hall.
Van Den Enden, A method for the determination of the solid phase content of fats using pulse nuclear magnetic resonance, Fette Seifen Anstrichmittel, Sep. 23, 1977, 80, 180-186.
Kochhar, Influence of Processing on Sterols of Edible Vegetable Oils, Prog. Lipid Res., 1983 vol. 22 pp. 161-188, Pergamon Press Ltd.
Lipson et al, Interpretation of X-ray Powder diffraction Patterns, H Lipson and H Steeple 1970, chapter 9, 244-263.
Lopez et al, Milk fat and primary fractions obtained by dry fractionation1.Chemical composition and crystallisation properties, Chemistry and Physics of Lipids, 2006, 144, 17-33, Elsevier.
Micallef et al., Beyond blood lipids: phytosterols, statins and omega-3 polyunsaturated fatty acid therapy for hyperlipidemia, Journal of Nutritional Biochemistry, Jun. 19, 2009, 20, 927-939, Elsevier.
Pernetti et al., Structuring of edible oils by alternatives to crystalline fat, Colloid & Interface Science, Jul. 18, 2007, vol. 12, 221-231.

* cited by examiner

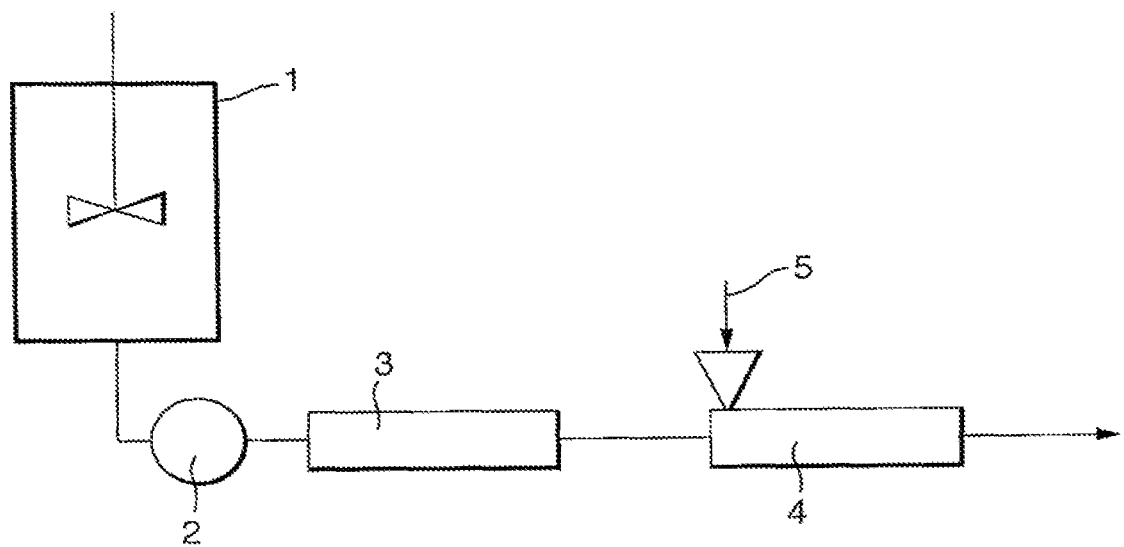

PROCESS FOR THE PREPARATION OF A SPREADABLE DISPERSION

This application is a continuation of Ser. No. 11/884.282, filed Jul. 14, 2008 now U.S. Pat. No. 8,147,895 which is a 371 of PCT/EP06/00800 filed Jan. 25, 2006.

FIELD OF THE INVENTION

The present invention relates to a process for the preparation of a spreadable edible dispersion comprising oil and structuring agent, in particular to such dispersions comprising oil and structuring agent as continuous phase and a dispersed phase. The dispersed phase may be an aqueous liquid (thus forming a water-in-oil emulsion) and/or a solid particulate matter. (thus forming a suspension).

BACKGROUND OF THE INVENTION

Edible dispersions comprising oil and structuring agent are well known. Examples of well-known products that substantially consist of such edible dispersions are water-in-oil emulsions, such as for instance Margarines and spreads. These edible dispersions typically have an oil phase that is a blend of liquid oil and fat that is solid at normal ambient temperature (20° C.). This solid fat, often also designated as hardstock, acts as structuring agent, and its function is to stabilise the dispersion. For a margarine or spread, ideally the structuring agent has such properties that it should have melted or dissolved at mouth temperature, otherwise the product has a heavy, waxy mouth feel.

Other known dispersions comprising oil and structuring agent are disclosed in EP-A-775444 and WO 98/47386. Herein the dispersed phase is a dry particulate matter, such as e.g. flour, starch, salt, spices, herbs etc. Generally, the edible dispersions comprising structuring agent are prepared according to prior art processes that encompass the following steps:

1) mixing/dispersion of the aqueous phase and/or the solid phase and the oil phase, at a temperature where the oil phase, including the structuring agent is liquid;
2) formation of a fat crystal network to stabilise the resulting dispersion and give the product some degree of firmness;
3) modification of the crystal network to produce the desired firmness and confer plasticity.

In case the dispersion is a low-fat water-in-oil emulsion spread (i.e. with a oil content of 45 wt % or less), normally in step 1) a oil-in-water emulsion (premix) is formed, which in step 2) is inverted, so that a transition of the emulsion from oil-in-water to water-in oil (inversion) occurs. Inversion has a number of disadvantages: it is difficult to control and rework (i.e. material that is not packed, but returned to the premix, needs to be reinverted, which may lead to processing complications.

The steps 1)-3) are usually conducted in a process that involves apparatus that allow heating, cooling and mechanical working of the ingredients, such as the churn process or the votator process. The churn process and the votator process are described in Ullmanns Encyclopedia, Fifth Edition, Volume A 16 pages 156-158. Using these techniques excellent dispersions (spreads) having high emulsion stability and good melting properties in the mouth can be prepared.

However, a disadvantage of the known processes is that the process involves a heating step and a cooling step and therefore requires a lot of energy. In a dispersion with for instance 4 wt. % structuring agent the whole weight of the dispersion (100 wt. %) needs to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids in the structuring agent is usually relatively high. Saturated fatty acids are a known risk factor for cardiovascular health.

Further disadvantage of the known processes is that the product may deteriorate due to the changes in temperature caused by the heating and cooling step and that heat-sensitive ingredients cannot be incorporated.

Additionally, when low-fat spreads are prepared an inversion step is usually needed, which is difficult to control and has rework problems.

Co-pending application PCT/EP2004/006544 describes edible dispersions, including water-in-oil emulsions, that comprise a structuring agent having a microporous structure of submicron size particles. The water-in-oil emulsion may be a table spread. In the examples pourable emulsions and pourable dispersions were described. The edible dispersions may for instance be prepared by mixing an oil phase with structuring agent particles with a separately prepared water phase.

SUMMARY OF THE INVENTION

It is therefore an object of the invention to provide a process for the preparation of a spreadable dispersion that requires less energy than the known processes. Another object is to provide such a process that allows the use of more types of structuring agent, especially more sorts of hardstock. A further object of the invention is a reduction of the amount of saturated fatty acids in the hardstock. Still a further object of the invention is to provide a process for the preparation of a dispersion that allows the incorporation of heat-sensitive ingredients and/or that avoids deterioration of the emulsion.

One or more of these objects is attained according to the invention which provides a process for the preparation of a spreadable edible dispersion wherein a mixture of oil and solid structuring agent particles is subjected to stirring and an aqueous phase is gradually added to the mixture until a dispersion is obtained, wherein the solid structuring agent particles, also described as secondary particles have a microporous structure, and said particles are agglomerates of primary particles of submicron size, said primary particles are platelets having an average thickness of 0.01-0.5 μm.

Gradually is herein defined as not adding the whole solid or aqueous phase at the start of the process, but in two or more portions at different times during the process if conducted batchwise or in two or more places in the process equipment in a continuous process.

With the process according to the invention, products are obtained that have a smaller water droplet size (D3,3 as described herein) and a firmer structure (Stevens value as described herein measured at room temperature) than products prepared according to the prior art votator process. The smaller water droplet size leads to increased microbiological stability, so products may be made that need less or no salt and/or preservative.

Further according to the invention low fat spreads may be prepared that need no thickenener or gelling agent in the water phase. When low-fat spreads are prepared an additional advantage of the process according to the invention is that no inversion is needed.

Contrary to the process described in Co-pending application PCT/EP2004/006544, in the present process the aqueous phase and/or solid phase is gradually added to the mixture until a dispersion of the desired oil content is obtained. This makes the preparation of dispersion having a relatively low oil content, i.e. below 45 wt. %, possible.

DESCRIPTION OF THE FIGURES

FIG. 1 Process flow diagramme for &continuous process. (1) designates a premix vessel, (2) a pump, (3) a high shear mixer, (4) an extruder type mixer and (5) a feed entrance for micronised fat.

DETAILED DESCRIPTION OF THE INVENTION

According to the invention, an aqueous phase is gradually added to a mixture of oil and solid structuring agent particles which is stirred, until a dispersion is obtained.

A dispersion is herein defined as a system in which two or more phases that are insoluble or only slightly soluble are distributed in one another.

The dispersion may be an emulsion, a suspension or foam or any combination thereof, it may be oil continuous, water continuous or hi-continuous. Preferably the dispersion is oil continuous, more preferably an oil continuous emulsion or oil continuous suspension.

Where a solid phase is present in the dispersion according to the invention, it is preferably a solid phase of dry particulate matter.

Where an aqueous phase is present in the dispersion according to the invention, it is preferably a dispersed aqueous phase.

The amounts given will be expressed in wt. % relative to the total weight of the food composition, unless indicated otherwise.

Fat and oil may sometimes be used interchangably herein, for instance fat phase and oil phase and fat content or oil content may be used to indicate the same.

According to the invention spreadable edible dispersions are provided comprising micronised structuring agent particles wherein said structuring agent particles, also described as secondary particles have a microporous structure, and said particles are agglomerates of primary particles of submicron size, said primary particles are platelets having an average thickness of 0.01-0.5 µm, wherein the dispersion has a Stevens value, as defined herein and measured at room temperature, of 30 g or more, preferably 50 g or more, more preferably 80 g or more and most preferably 100 g or more.

Preferably the dispersion is a low-fat water-in-oil emulsion spread having a fat content of 45 wt. % or less.

The invention further provides a low-fat water-in-oil emulsion spread having a fat content of 45 wt. % or less, a Stevens value as defined herein as defined herein and measured at room temperature, of 60 g or more and a saturated fat content (SAFA) of 25 wt. % or less SAFA content (wt. %) is herein expressed based on the weight of the fat phase.

Preferably the spreadable edible dispersions according to the invention have a low water droplet size, preferably the water droplet size as defined herein is 10 µm or less, more preferably 5 µm or less.

According to the invention, the dispersion is formed by mixing oil, the solid structuring agent particles and the other phase or phases of the dispersion, such as for example an aqueous phase, a solid phase or a gas phase.

According to the invention, the solid structuring agent particles (also described herein as secondary particles) should have a microporous structure of submicron size particles (also described herein as primary particles).

The secondary particles are agglomerates of primary particles which have a microporous structure. The size of the primary particles is submicron (that is have a diameter below 1µ).

An example of a microporous structure is shown in FIGS. 6 and 7 of PCT/EP2004/006544. The primary particles typically have the shape as shown in FIG. 7, in which the platelets with submicron dimensions are the primary particles. The thickness of the platelets should be submicron, preferably the thickness is on average 0.01-0.5 µm, more preferably 0.03-0.2 µm, even more preferably 0.06-0.12 µm.

Equivalent good results were obtained for a secondary particles having a microporous structure of more bubble-like shape, such as shown in FIG. 10 of PCT/EP2004/006544. In such microporous structure the wall thickness of the bubbles should be submicron, for instance on average 0.01-0.5 µm, more preferably 0.03-0.2 µm, even more preferably 0.06-0.12 µm.

The secondary particles, may, in the course of the preparation of the dispersion, for instance through the force of a mixer, be broken into submicron particles. The resulting submicron particles will form the structuring network of the dispersion.

Preferably, the structuring agent is edible lipid, more preferably it is edible fat. Edible fats consist predominantly of triglycerides. Typically such edible fats suitable as structuring agent are mixtures of triglycerides, some of which have a melting point higher than room or ambient temperature and therefore contain solids in the form of crystals.

The solid structuring agent, also denoted as hardstock, serves to structure the fat phase and helps to stabilise the dispersion.

For imparting to common margarine a semi-solid, plastic, spreadable consistency this stabilising and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

The process according to the invention may be executed batch-wise or continuous. Conventional unit operations and apparatus, e.g. mixers, pumps and extruders may be used. A suitable process flow diagram for a continuous process according to the invention is given in FIG. 1. Micronised fat may be added to the premix or via the inlet (5), preferably at least part of the micronised fat is added via inlet (5).

Further common ingredients of the fat phase are emulsifiers, such as monoglycerides and lecithin, colouring agents and flavours.

The solid structuring agent particles (secondary particles) preferably have an average particle size ($D_{3,2}$) of 60 micrometer or less, more preferably the solid structuring agent particles have an average particle size of 30 micrometer or less. The average particle size ($D_{3,2}$) is determined as indicated in the examples.

Preferably the solid structuring agent particles are prepared using a micronisation process. In the micronisation process the solid structuring agent particles are prepared by preparing a homogeneous mixture of structuring agent and liquified gas or supercritical gas at a pressure of 5-40 MPa and expanding the mixture through an orifice, under such conditions that a spray jet is applied in which the structuring agent is solidified and micronised. The liquified gas or supercritical gas may be any gas that may be used in the preparation of food products, for example carbondioxide, nitrogen, propane, ethane, xenon or other noble gases. Carbondioxide and propane are preferred. Carbondioxide is most preferred. Advantages of carbondioxide are that it has a mild (31° C.) critical temperature, it is non-flammable, nontoxic, environmentally friendly and it may be obtained from existing industrial processes without further contribution to the greenhouse effect. It is fairly miscible with oil and is readily recovered owing to its high volatility at ambient conditions. Finally liquid $CO_2$ is the second least expensive solvent after water.

The temperature of the mixture of structuring agent and liquified gas or supercritical gas is preferably such that the mixture forms a homogeneous mixture. Advantageously, the temperature of the mixture of structuring agent and liquified gas or supercritical gas is below the slip melting point of the structuring agent at atmospheric pressure and above the temperature at which phase separation of the mixture occurs. Under such conditions the smallest micronised particles may be obtained.

The pressure and temperature of the mixture of structuring agent and liquified or supercritical gas is preferably such that a large amount of the gas may be dissolved in the structuring agent. The amount dissolved will be determined by the phase diagram of the mixture of structuring agent and liquified or supercritical gas. At higher pressures as well as at lower temperatures more gas will dissolve in the structuring agent.

Preferably the temperature and pressure are chosen such that 10 wt. % or more, more preferably 20 wt. % or more or most preferably 30 wt. % or more of gas is dissolved in the liquid phase. The mixture of structuring agent and liquified or supercritical gas may contain additional substances, such as for instance oil. We have found that the addition of oil may reduce sintering of the micronised particles of the structuring agent.

The mixture containing structuring agent and liquified or supercritical gas is depressurised over a small orifice or nozzle, to break up the mixture into small droplets. The break-up of the mixture into droplets can be assisted e.g. by internals inside the nozzle before the orifice to generate a whirl, or by passing a gas at a high flow rate near the orifice.

The mixture is depressurised into a volume where the pressure is higher than, equal to or lower than atmospheric pressure.

We have found that sintering, agglomeration and ripening of micronised particles of the structuring agent will lead to a reduced performance of the particles for structuring the dispersion.

To avoid sintering, agglomeration and/or ripening of the micronised particles, preferably a gas jet is applied in addition to the flow of the spray jet. The additional gas jet is most effective when the gas jet is positioned such that recirculation of material expanded through the orifice is reduced or avoided. Especially advantageous is a position wherein the gas from the gas jet flows essentially tangentially to the flow direction of the spray jet. Most advantageously the gas inlet for the gas jet is positioned behind the exit of the nozzle, see FIG. 2 of co-pending application PCT/EP2004/006544. This figure shows that the additional gas inlet (1) behind the exit of the nozzle (2) creates a gas flow (3) tangentially to the flow of the spray jet (4).

A further preferred edible dispersion according to the invention is a dispersion of a solid matter, preferably a dry particulate matter, dispersed in a continuous phase of oil and structuring agent. Preferred material for the dry particulate matter is one or more of flour, starch, salt, herbs (e.g. dried herbs), spices and mixtures thereof. Preferably in such dispersions, the amount of solid matter is 30-75 wt. %, more preferably 40-65 wt. % based on total weight of the dispersion.

The amount of structuring agent should be such that a suitably stable dispersion is obtained. When the structuring agent is micronised fat, the amount is preferably 1-20 wt. %, more preferably 4-12 wt. % based on total weight of the dispersion.

EXAMPLES

General

Method to Determine Slip Melting Point The slip melting point of structuring agent is determined in accordance with F. Gunstone et al, The Lipid Handbook, second edition, Chapman and Hall, 1995, page 321, Point 6.2.3, Slip point.

Method to Determine $D_{3,2}$ of the Particle Size Distribution of Micronised Fat Particles Low-angle laser light scattering (LALLS, Helos Sympatic) was used to measure the average particle size ($D_{3,2}$). The fat particles were suspended in water in a quixel flow cuvette with an obscuration factor of 10-20%. The diffraction pattern was measured at 632.8 nm with a lens focus of 100 mm and a measurement range of 0.5-175 µm. Calculations were bases on the Fraunhofer theory.

A full description of the principle of LALLS is given in ISO 13320-1.

Method to Determine $D_{3,3}$ of Water Droplet Size Distribution in an Emulsion

The water droplet size was measured using a well-known low resolution NMR measurement method. Reference is made to Van den Enden, J. C., Waddington, D., Van Aalst, H., Van Kralingen, C. G., and Packer, K. J., Journal of Colloid and Interface Science 140 (1990) p. 105.

Method to Determine Oil Exudation

Oil exudation is determined by measuring the height of the free oil layer that appears on top of the product. This free oil layer is considered a product defect. In order to measure oil exudation, the product is filled into a scaled glass cylinder of 50 ml. The filling height is 185 mm. The filled cylinder is stored in a cabinet at constant temperature (15° C.). Height measurements are executed every week, by measuring the height of the exuded oil layer in mm with a ruler. Oil exudation is expressed as the height of the exuded oil layer divided by the original filling height and expressed in %. Shaking of the cylinders should be avoided.

Stevens Value

Stevens values give an indication about the firmness of a product. The firmness of all products stored at 5° C. for 24 hours was measured at room temperature using a Stevens Texture Analyser (1 mm/sec, 25 mm depth, 4.4. mm probe) and is quoted herein as the Stevens value (in g).

Example 1

Preparation of a Spreadable Margarine

A high-fat spreadable margarine was prepared with the composition shown in table 1:

TABLE 1

Composition of high-fat spreadable margarine

| Ingredient | Amount (wt. %) |
|---|---|
| Oil phase | |
| Sunflower oil | 59.68 |
| Micronised fat powder[1] | 9.64 |
| Lecithin Bolec ZT[1] | 0.32 |
| Emulsifier Hymono 8903 | 0.20 |
| beta-carotene (0.4 wt. % solution in sunflower oil) | 0.15 |
| Water phase | |
| Water | 29.65 |
| Potassium sorbate | 0.08 |
| Sodium chloride | 0.28 |

[1]Hardstock fat as prepared in example 1 and 2 of EP-A-89082 which was micronised as in example 1 of PCT/EP2004/006544.

The water phase was prepared by adding salt and potassium sorbate to distilled water and adjusting the pH of distilled water from 7.7 to 4.0 using 5 wt. % solution of citric acid in water, and heated for 5 minutes in a bath of 60° C. to dissolve the solids. The oil phase was prepared by dissolving the emulsifier ingredients and β-carotene in the total amount of sunflower oil at 60° C. and cooled down to 15° C. afterwards. Subsequently the micronised fat powder was added to the oil phase carefully using a spatula and the oil phase was mixed with a kitchen mixer (Philips Essence HR1357/05) for 2 minutes. Then the water phase was added to the oil phase and the resulting mixture was mixed with the mixer for another 5 minutes at ambient temperature. A droplet size (D3,3) of about 10 µm was obtained. The spread was put in a margarine tub and stored at 5° C. Results in table 3.

Example 2

Preparation of a Low-Fat Spread

A low-fat (33 wt. % fat) spreadable, margarine spread was prepared with the composition shown in table 2:

TABLE 2

Composition of low-fat spread

| Ingredient | Amount (wt. %) |
|---|---|
| Oil phase | |
| Sunflower oil | 27.65 |
| Micronised fat powder as in example 1 | 4.59 |
| Lecithin Bolec ZT[1] | 0.32 |
| Emulsifier Hymono 8903 (monoglyceride) | 0.33 |
| Beta-carotene (0.4 wt. % solution in sunflower oil) | 0.15 |
| Water phase | |
| Water | 66.60 |
| Potassium sorbate | 0.08 |
| Sodium chloride | 0.28 |

The micronised fat powder was mixed with half of the oil to obtain a fat powder/oil slurry. The fat/oil slurry was then stirred manually in the remainder of the oil to make the oil phase. In the next step the oil phase (slurry) was put in an EscoLabor device and half of the water phase was added to the oil phase. The EscoLabor vessel was kept at 5° C. The water and oil phase were mixed under vacuum.

The scraper speed was found to be 80% of the maximum rotational speed and power of the Ultra Turrax was found to be optimal at 50% of maximum power. During the mixing of the oil- and water phases the remaining amount of water was added cautiously within 5 minutes. This yielded a homogeneous but very thick fat continuous product after 15 minutes. After 15 a droplet size (D3,3) of 3 µm was obtained. This low fat spread was evaluated after 4 weeks of storage at 5° C. Results are given in table 3.

TABLE 3

Stevens values and fat level low-fat micronised fat spread

| Example | Fat level (%) | Stevens value at 5° C. (g) |
|---|---|---|
| Example 1 | 70 | 88 |
| Example 2 | 33 | 112 |

Example 3

A spread was produced with a composition as in table 4. A stable spread resulted. The water phase was made by mixing the salt in distilled water and holding the mixture at room temperature. The fat phase was produced by adding the micronised fat powder to liquid oil using a spatula. The water phase and the oil phase were mixed using a home kitchen mixer.

It was possible to prepare a stable spread without emulsifier and thickener. The long term stability and/or consistency of the spread without emulsifier may be improved by adding a thickener to the water phase, e.g. 1 wt. % starch, a suitable starch type is Resistamyl 310.

TABLE 4 composition of example 3

| | | |
|---|---|---|
| Oil Phase | | 39.85 |
| | Sunflower oil | 33.87 |
| | Micronised fat powder as in example 1 | 5.98 |
| | Beta-carotene (0.4 wt. % solution in Sunflower oil) | 0.15 |
| Water phase | Water | 59.5 |
| | Salt | 0.5 |
| | | 100 |

The invention claimed is:

1. Process for the preparation of a spreadable edible dispersion comprising subjecting a mixture of oil and solid structuring agent particles to stirring and gradually adding an aqueous phase to the mixture until an oil continuous dispersion is obtained, said dispersion being an emulsion or a suspension, or any combination thereof, wherein the solid structuring agent particles, also described as secondary particles have a microporous structure, and said particles are agglomerates of primary particles of submicron size, said primary particles are platelets having an average thickness of 0.01-0.5 µm.

2. Process according to claim 1, wherein the solid structuring agent particles are edible lipid.

3. Process according to claim 2, wherein the lipid is a fat.

4. Process according to claim 1, wherein the solid structuring agent particles were prepared using a micronisation process wherein the solid structuring agent particles were prepared by preparing a homogeneous mixture of structuring agent and liquefied gas or supercritical gas at a pressure of 5-40 MPa and expanding the mixture through an orifice, under such conditions that a spray jet was applied in which the structuring agent was solidified and micronised.

5. The process according to claim 4 wherein the homogeneous mixture consists of structuring agent and liquefied gas or supercritical gas.

6. The process according to claim 4 wherein the dispersion comprises an oil continuous emulsion.

7. The process according to claim 4 wherein the dispersion comprises a water-in-oil emulsion spread having a fat content of 45 wt % or less.

8. The process according to claim 4 wherein the homogeneous mixture consists of structuring agent, oil and liquefied gas or supercritical gas.

9. Spreadable edible dispersion obtainable by a process according to claim 1.

10. The dispersion according to claim 9 which comprises an oil continuous emulsion.

11. The dispersion according to claim 9 which comprises a water-in-oil emulsion spread having a fat content of 45 wt % or less.

12. The process according to claim 1 wherein the dispersion comprises an oil continuous emulsion.

13. The process according to claim 1 wherein the dispersion comprises a water-in-oil emulsion spread having a fat content of 45 wt % or less.

14. Process for the preparation of a spreadable edible dispersion comprising subjecting a mixture of oil and solid structuring agent particles to stirring and gradually added an aqueous phase to the mixture until a dispersion is obtained, said dispersion being an emulsion, a suspension, or foam or any combination thereof, wherein the solid structuring agent particles, also described as secondary particles have a microporous structure, and said particles are agglomerates of primary particles of submicron size, said primary particles are platelets having an average thickness of 0.01-0.5 μm wherein the solid structuring agent particles were prepared by preparing a homogeneous mixture of structuring agent and 10 wt % or more liquefied gas or supercritical gas dissolved into liquid at a pressure of 5-40 MPa and expanding the mixture through an orifice, under such conditions that a spray jet was applied in which the structuring agent was solidified and micronised.

15. Process according to claim 14 wherein the solid structuring agent particles comprise edible lipid.

16. Process according to claim 15 wherein the lipid comprises a fat.

17. Process according to claim 14 wherein the homogeneous mixture consists of structuring agent oil and liquefied or supercritical gas.

18. Process according to claim 14 wherein the homogeneous mixture consists of structuring agent and liquefied or supercritical gas.

19. Process according to claim 14 wherein in the spreadable edible dispersion which is prepared, crystals of solid fat form a network throughout the liquid oil resulting in a structured fat phase imparting a semi-solid, plastic, spreadable consistency.

* * * * *

UNITED STATES PATENT AND TRADEMARK OFFICE
CERTIFICATE OF CORRECTION

| | | |
|---|---|---|
| PATENT NO. | : 8,927,045 B2 | Page 1 of 1 |
| APPLICATION NO. | : 13/435943 | |
| DATED | : January 6, 2015 | |
| INVENTOR(S) | : Barendse et al. | |

It is certified that error appears in the above-identified patent and that said Letters Patent is hereby corrected as shown below:

On the title page item 76

The correct inventors name should be:

-- DIRK SIMON HENDRIKUS VAN HORSEN --

Signed and Sealed this
Twenty-sixth Day of April, 2016

Michelle K. Lee
*Director of the United States Patent and Trademark Office*